United States Patent Office 2,819,554
Patented Jan. 14, 1958

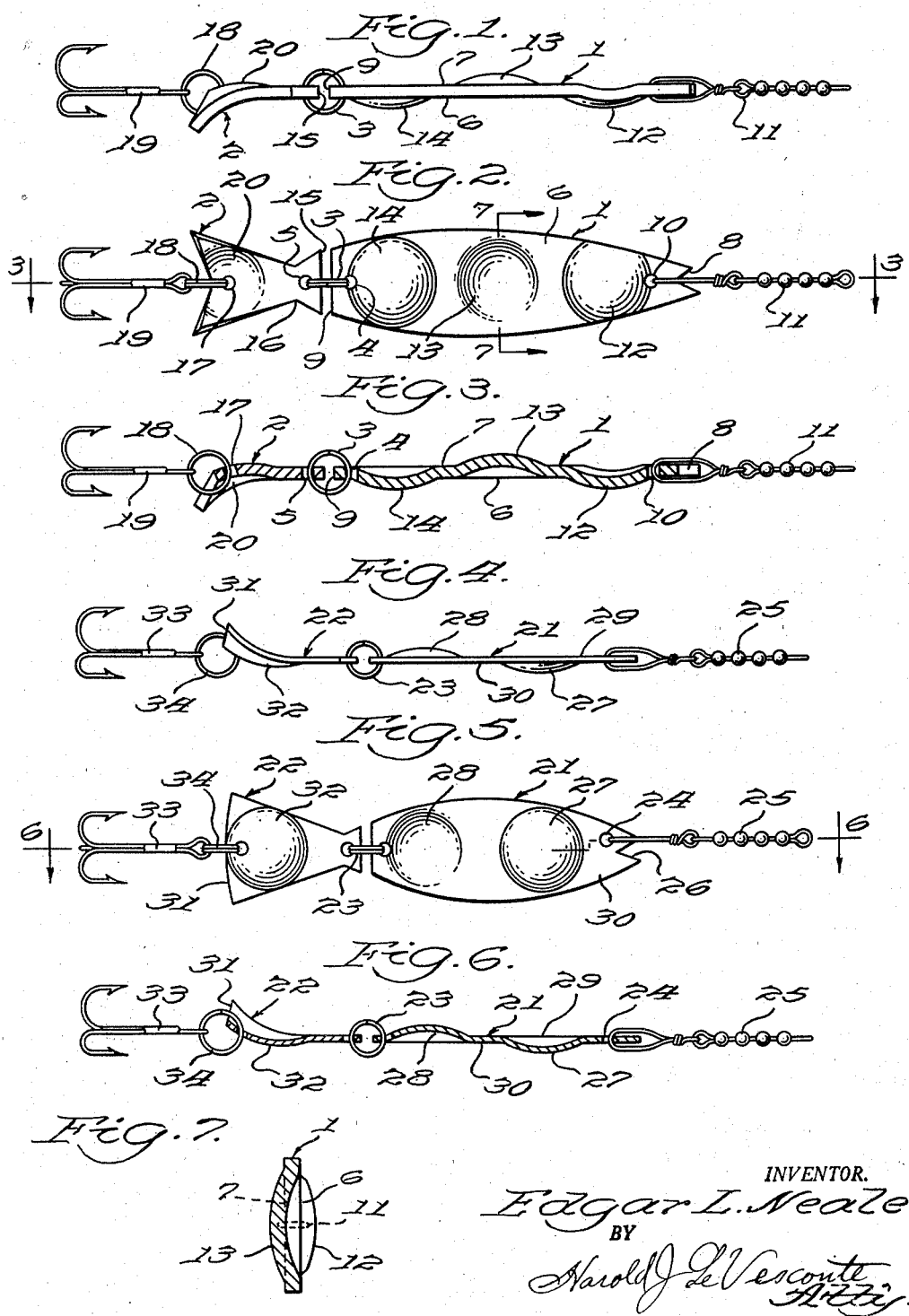

2,819,554

FISHING LURE

Edgar L. Neale, Van Nuys, Calif.

Application April 2, 1956, Serial No. 575,531

5 Claims. (Cl. 43—42.18)

This invention relates to fishing lures and more particularly to an improved form thereof characterized by simplicity and ruggedness of construction and life-like simulation of a swimming fish when dragged through the water.

The principal object of the invention is to provide a fishing lure comprising a body section and a tail section loosely coupled thereto; both shaped to partake of a lateral wiggling movement when dragged through the water with the tail section having a more rapid movement than the body section.

Another object of the invention is to provide a fishing lure formed of flat, rigid sheet material in which the material is formed with oppositely disposed concavo-convex portions which impart the desired wiggling movement to the lure.

A further object of the invention is to provide a fishing lure comprising a pair of sheet metal pieces shaped in plan to resemble the head and body and the tail portions respectively of a fish and in which the head and body portion has oppositely disposed concavo-convex areas formed therein arranged in the longitudinal line of the body and in which the tail portion is formed with a single concavo-convex portion oppositely disposed with respect to the adjacent concavo-convex portion of the head and body portion.

Still another object of the invention is to provide a fishing lure in which the foregoing objectives are realized in practice, which is simple in construction, formed parts susceptible of economical manufacture and assembly, and which is reliable for its intended purpose.

With the foregoing objects in view, together with such additional objects and advantages as may subsequently appear, the invention resides in the parts, and in the construction, combination and arrangement of parts described, by way of example in the following specification disclosing certain presently preferred forms or embodiments of the invention; reference being had to the accompanying drawings which form a part of said specification and in which drawings:

Fig. 1 is a top plan view of a fishing lure embodying the invention,

Fig. 2 is a side elevation of the lure shown in Fig. 1,

Fig. 3 is a longitudinal, medial sectional view taken on the line 3—3 of Fig. 2, Fig. 4 is a top plan view of a fishing lure comprising a second embodiment of the invention, Fig. 5 is a side elevation of the lure shown in Fig. 4, Fig. 6 is a longitudinal, medial sectional view taken on the staggered line 6—6 of Fig. 5, and Fig. 7 is an enlarged scale, transverse sectional view taken on the line 7—7 of Fig. 2.

Referring first to Figs. 1, 2, 3 and 7 the first embodiment of the invention comprises a lure including a combined head and body portion 1 and a tail portion 2 loosely connected to the head and body portion (hereinafter referred to as the front portion) by a split ring 3 inserted through appropriate holes 4 and 5 in the respective portions. The front portion is preferably formed from a sheet metal blank having straight, parallel side surfaces and having a perimeter 6 and 7 of substantially elongated ovate configuration; one end thereof being provided with a notch 8 in simulation of a fish's mouth and the other end 9 being cut off at right angles to the length of the portion and having the hole 4 formed adjacent thereto in the longitudinal center line of the portion. The notched end of the front portion is provided with a hole 10 to which a means for attaching the lure to a line is attached, such as the swivel 11.

The front portion is provided with means for causing it to partake of a wabbling movement when drawn through the water; said means comprising forming the body member with a series of concavo-convex deformations as at 12, 13 and 14; These deformations are preferably spaced at regular intervals along the front portions and are arranged in alternation along the centerline of the front portion so that with three of said deformations, one convex surface is disposed at one side and between two oppositely disposed convex surfaces. Thus, as best seen in Fig. 1 the front portion comprises parallel straight side surfaces interrupted by the said deformations and since the deformations are disposed in the center line of the front portion, the portion is maintained in balance with respect to the effect of being drawn through the water with no tendency to roll. At the same time, the oppositely projecting convex surfaces will impart the desired wabbling movement as the lure is drawn through the water. The sides of the lure are highly polished and the concave and convex surfaces thereof will serve to concentrate and diffuse light beams with intermittent flashing effect deriving from the wabbling movement and this may in part explain the demonstrated fish catching ability of lures of the character described.

The tail portion 2 is also shaped from a blank of sheet metal and in side elevation has a configuration which included a square end 15 of the same width as the rear end of the front portion adjacent to which the hole 5 is located; the remainder of the periphery of said tail being shaped to complete the simulation of a fish by first being narrowed as at 16 and thence being widened to provide a simulation of a forked tail. The rear end of the tail portion adjacent the inner extremity of the notch forming the fork is provided with a hole 17 for reception of a split ring 18 by which a hook 19 is attached to the lure; said hole 17 also being in the longitudinal line of the lure. The tail portion is laterally deformed on concavo-convex configuration as at 20; preferably by the same tool used to form the deformations in the front portion but the rear ends of the tail portion are not confined to the flat plane and extend generally tangent to the curve of the deformation with resultant increase of the effective surface inclined to the flat plane of the tail portion and the tail portion is attached with the convex side thereof on the same side of the lure as the deformation 13 so that all of the said deformations in the lure are arranged in alternation from front to rear. The tail portion is much shorter than the front portion and also since the deformation thereof is proportionally greater than the deformations on the front portion, it will wabble at a much faster rate than the front portion when the lure is drawn through the water with resultant simulation of a wounded minnow or small fish which increases the attractiveness of the lure.

Referring next to Figs. 4, 5 and 6 which show the second embodiment of the invention, the lure there is smaller and is formed from thinner material than the first form. It comprises a front portion 21 and a tail portion 22 similarly loosely interconnected by a split ring 23. The hole 24 at the forward end of the front portion to which the leader 25 is attached is disposed slightly above the notch 26 which simulates the mouth of the fish represented by the lure; the said notch being in the longitudinal center line of the lure as are the holes by which the lure portions are interconnected by the ring 23. The front portion is provided with oppositely disposed concavo-convex deformations 27 and 28 located adjacent the front and rear ends of the front portion; the deformations being of the same character as the corresponding deformations in the first described form and the remainder of the side areas of the front portion comprise the parallel flat sides 29 and 30 which serve to prevent rolling tendency of the lure.

The tail portion 22 is proportionately longer with respect to the length of the front portion than in the first form of the invention and is formed with a rounded end 31 rather than the forked end of the first embodiment; the shaping in this respect being a matter of choice in the representation or simulation of a particular bait fish or minnow. It is similarly provided with a concavo-convex deformation 32 and is attached to the front portion with the convex surface thereof disposed at the side of the lure opposite the convex side of the deformation 28 of the front portion so that the three deformations are arranged in alternations. A hook 33 is attached to the rear of the tail portion by a split ring 34.

The action of this form of the lure is the same as the first described form. When dragged through the water, the deformations 27 and 28 assisted by the drag imposed by the line will cause the front portion to wabble from side to side at a slower rate than the wabbling motion of the more deeply deformed and shorter tail portion which is more free to move by reason of its mode of connection to the front portion. This combination of movements provides the simulation of a swimming or wounded minnow. Also, as in the first form of the invention the reflecting characteristics of the rounded deformations assist in attracting fish to the lure.

The lure is thus simply made and the plan configuration can be widely varied in shape. The deformations which impart the wabbling movements to it can conveniently be made with the same punch and die regardless of the form of the portions of the lure and the material from which the portions are formed can be sheet metal or plastic. The colors can be either that of the material or applied colors and the metal can be polished or given a surface effect to simulate scales and the latter can be in any desired coloring. The mode of attachment of the portions to each other can be by the illustrated split rings or any other mode of connection that will give the desired freedom of movement to the tail portion and the same considerations apply to the attaching means for the leader and hook. The invention is directed to and achieves a lure which has a close simulation to a swimming or wounded bait, which is simple and sturdy in construction and reliable in use.

While the foregoing specification discloses presently preferred embodiments of the invention, it is not to be inferred that the invention is limited to the embodiments disclosed by way of example, and it will be understood that the invention includes as well all such changes and modifications in the parts, and in the construction, combination and arrangement of parts as shall come within the purview of the appended claims.

I claim:

1. A fishing lure comprising a front portion and a tail portion loosely connected to one end of said front portion; said front portion at its other end having means for attachment to a fishing line; said portions being formed from rigid, flat sheet material and as viewed in side elevation having an outline resembling a fish; said front portion having a series of concavo-convex deformations formed therein and spaced along the longitudinal center line thereof with the convex sides of successive deformations projecting from opposite sides of said front portion and said tail portion having a similar deformation disposed with the convex side thereof at the side of said tail portion opposite the side of said body portion from which the rearmost of said deformations projects, and a hook loosely coupled to the rear end of said tail portion in the longitudinal center line of said lure.

2. A fishing lure comprising two flat sheet metal parts arranged in end to end relation and loosely coupled together with substantial preservation of alignment of the flat surfaces thereof and including a front portion shaped to resemble the head and body portions of a fish and a tail portion of less length than said front portion and shaped to resemble the tail portion of the fish represented by said front portion; said front portion being provided with laterally extending, oppositely projecting concavo-convex deformations effective to impart a laterally wabbling movement to said front portion when drawn through the water, and said tail portion having a single concavo-convex deformation of greater lateral extent than the deformations of said front portion to effect an independent laterally wabbling movement to said tail portion when drawn through the water; the rate of wabbling of said tail portion being faster than the rate of said front portion with resultant simulation of a crippled or injured minnow by the movement of said lure through the water.

3. A lure as claimed in claim 2 in which said front portion has at least three of said deformations formed therein spaced along the longitudinal center-line of said front section and arranged with the portions thereof which protrude beyond the flat surface of the front section disposed in alternation at opposite sides of said front section, and in which said tail portion has a single deformation which protrudes beyond the flat surface of said tail section at the side thereof opposite the side of said front section from which the nearest of said deformations of said front portion protrudes.

4. A lure as claimed in claim 2 in which said front portion is provided with two deformations which are arranged along the longitudinal center line of said front portion with said deformations protruding from opposite sides of said front portion and in which said tail portion is provided with a single deformation which protrudes from the side thereof opposite the side of said front portion from which the rearmost of said two deformations protrudes.

5. A lure as claimed in claim 2 in which the rear end of said tail portion is provided with a fish hook loosely connected thereto.

References Cited in the file of this patent
UNITED STATES PATENTS

| | | |
|---|---|---|
| 1,179,964 | Robertson | Apr. 18, 1916 |
| 1,306,719 | Robertson | June 17, 1919 |
| 1,332,112 | Duhamel | Feb. 24, 1920 |
| 1,422,457 | McClanahan | July 11, 1922 |
| 2,645,875 | Chase | July 21, 1953 |